United States Patent
Day et al.

(10) Patent No.: US 7,089,373 B2
(45) Date of Patent: Aug. 8, 2006

(54) SHADOW REGISTER TO ENHANCE LOCK ACQUISITION

(75) Inventors: Michael Norman Day, Round Rock, TX (US); Roy Moonseuk Kim, Austin, TX (US); Mark Richard Nutter, Austin, TX (US); Yasukichi Okawa, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 10/460,423

(22) Filed: Jun. 12, 2003

(65) Prior Publication Data

US 2004/0255084 A1    Dec. 16, 2004

(51) Int. Cl.
G06F 12/00    (2006.01)
(52) U.S. Cl. ...................................... 711/145; 711/152
(58) Field of Classification Search ................ 711/141, 711/144, 145, 152
See application file for complete search history.

(56) References Cited

U.S. PATENT DOCUMENTS

| | | | | |
|---|---|---|---|---|
| 5,535,365 A | * | 7/1996 | Barriuso et al. ............ | 711/155 |
| 5,615,167 A | * | 3/1997 | Jain et al. .............. | 365/230.08 |
| 5,706,464 A | * | 1/1998 | Moore et al. .............. | 711/122 |
| 5,727,172 A | * | 3/1998 | Eifert et al. ................ | 710/110 |
| 6,549,989 B1 | * | 4/2003 | Arimilli et al. ............ | 711/144 |
| 2002/0174305 A1 | * | 11/2002 | Vartti ......................... | 711/145 |
| 2004/0073760 A1 | * | 4/2004 | Arimilli et al. ............ | 711/163 |

OTHER PUBLICATIONS

"The PowerPC Compiler Writer's Guide," edited by Hoxey et al., revision Jan. 1, 1996, published for IBM by Warthman Associates, Palo Alto, California, pp. 44-45.
PowerPC Virtual Environment Architecture, Book II, Section 1.8.2, changes, from [http://www-03.ibm.com/servers/eserver/pseries/library/ppc_chg2.html], Effective Dec. 13, 1994, pp. 336 & 337.

* cited by examiner

*Primary Examiner*—Mano Padmanabhan
*Assistant Examiner*—Kaushik Patel
(74) *Attorney, Agent, or Firm*—Carr LLP; Diana R. Gerhardt

(57) ABSTRACT

A method and an apparatus are provided for enhancing lock acquisition in a multiprocessor system. A lock-load instruction is sent from a first processor to a cache. In response, a reservation flag for the first processor is set, and lock data is sent to the first processor. The lock data is placed in target and shadow registers of the first processor. Upon a determination that the lock is taken, the lock-load instruction is resent from the first processor to the cache. Upon a determination that the reservation flag is still set for the first processor, a status-quo signal is sent to the first processor without resending the lock data to the first processor. In response, the lock data is copied from the shadow register to the target register.

44 Claims, 3 Drawing Sheets

SHADOW REGISTER TO ENHANCE LOCK ACQUISITION

BACKGROUND OF THE INVENTION

1. Field of the Invention

The invention relates generally to memory management in a multiprocessor system and, more particularly, to enhancing a lock acquisition mechanism.

2. Description of the Related Art

In a large symmetrical multi-processor system, lock acquisition is frequently used to synchronize access to data structures. Systems that run with producer-consumer types of applications have to make sure that the produced data is globally visible before signalling to the consumers so that they can access the produced data structure. Usually, the producer tries to acquire a lock using a lock-load instruction and verify on a lock-word value. Once the producer application has acquired the lock, the producer application is the owner of the data structure until it releases the lock. The consumer will have to wait for the lock to be released before accessing the data structure.

When attempting to acquire a lock, software "spins" or loops on an atomic update sequence that executes the lock load instruction and compares the data with a software specific definition indicating "lock_free." If the value is "not free," a branch back to lock load instruction is taken to restart the sequence. If the value does indicate free, the loop is exited and a conditional lock_store instruction is used to update the lock word to "lock taken." The lock store fails if the processor attempting to acquire the lock no longer holds the reservation made at lock load time. If this lock store fails, software again restarts the loop beginning with the lock load instruction. This spin loop of continually reading and re-reading the lock word when the lock is taken causes the same data to be retrieved out of cache over and over while the lock is taken by another processing element. Accessing the cache array to get the same data and send it again and again, while the lock is taken by another processor, is power consuming, is wasteful of cache access cycles (in cases of shared caches) and could create system live-lock in a large configuration system.

Therefore, a need exists for a system and method for saving power and preventing a potential live-lock situation.

SUMMARY OF THE INVENTION

The present invention provides a method and an apparatus for enhancing lock acquisition in a multiprocessor system. A lock-load instruction is sent from a first processor to a cache. In response to the lock-load instruction, a reservation flag for the first processor is set, and lock data is sent to the first processor. The lock data is placed in target and shadow registers of the first processor. It is determined from the lock data whether lock is taken. Upon a determination that the lock is taken, the lock-load instruction is resent from the first processor to the cache. It is also determined whether the reservation flag is still set for the first processor. Upon a determination that the reservation flag is still set for the first processor, a status-quo signal is sent to the first processor without resending the lock data to the first processor. In response to the status-quo signal, the lock data is copied from the shadow register to the target register.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
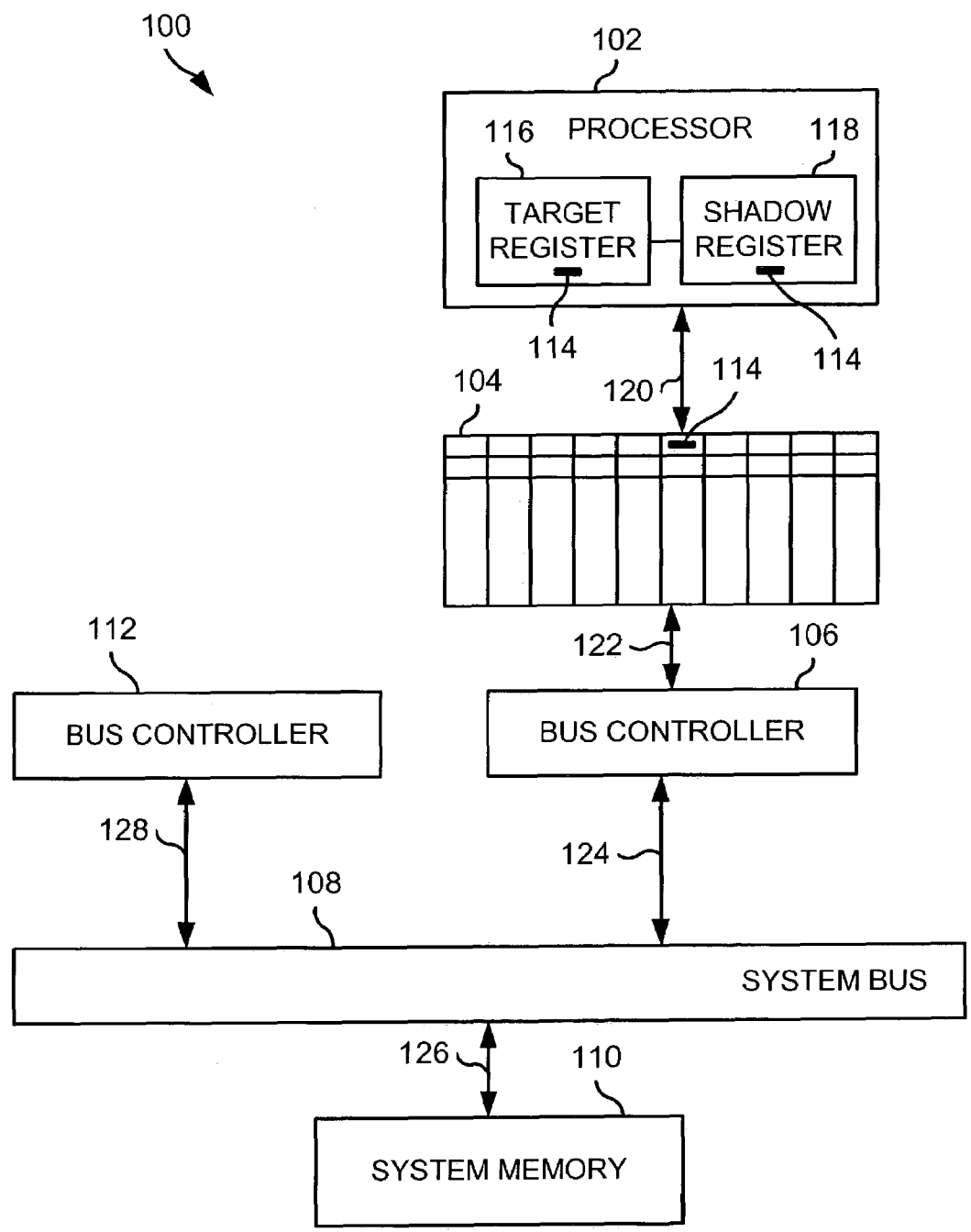
FIG. 1 is a block diagram illustrating a multiprocessor system with enhanced lock acquisition.

Referring to FIG. 1 of the drawings, the reference numeral 100 generally designates a multiprocessor system with enhanced lock acquisition embodying features of the present invention. The multiprocessor system 100 generally includes a first processor 102, a cache 104, a first bus controller 106, a system bus 108, a system memory 110, and a second bus controller 112. The first processor 102 includes target and shadow registers 116 and 118. The first processor 102 is coupled to the cache 104 via a connection 120 for communicating with the cache 104 including loading lock data 114. When the first processor 102 receives the lock data 114 from the cache 104, the first processor 102 places the lock data 114 in both the target register 116 and the shadow register 118. Preferably, the cache 104 is a level 2 (L2) cache of the first processor 102.

The cache 104 is coupled to the first bus controller 106 via a connection 122. The first bus controller 106 is also coupled to the system bus 108 via a connection 124. The system bus 108 is then coupled to the system memory 110 via a connection 126. Therefore, the cache 104 is in communication with the system memory 110 through the first bus controller 106 and the system bus 108. Also, the second bus controller 112 is coupled to the system bus 108 via a connection 128. Another bus master such as a second processor (not shown) may be coupled to the second bus controller 122 possibly through a second cache (not shown).

Generally, the multiprocessor system 100 has one or more additional processors (not shown) other than the first processor 102. Occasionally, the first processor 102 and any one of the additional processors need to access a particular memory address space (not shown) and possibly alter the data stored in the particular memory address space. In this case, it is important to reserve that particular memory address space for a single processor at a time. This is achieved by using a reservation flag and lock acquisition. The lock data 114 typically contains information as to which processor has a temporary, exclusive right to access a particular memory address space corresponding to the lock data 114. The reservation flag facilitates the process of lock acquisition by notifying any concerned processors whether they can attempt to acquire lock at a given point in time. One skilled in the art will understand that a reservation flag is cleared or reset if the first processor 102 executes a "store conditional" instruction to any memory address or executes another load and reserve instruction to another memory address, which clears the first reservation and establishes a new one. Further, one skilled in the art will understand that the reservation flag is also cleared or reset if another processor or other mechanism executes any store instruction to the reserved address.

Preferably, the lock data 114 includes a lock word (not shown), the value of which reflects whether lock is taken at a particular point in time. For example, the lock word consisting of all zero bits indicates that lock is not already taken on the aforementioned particular memory address space, whereas the lock word consisting of any non-zero bit(s) indicates otherwise. In this example, the first processor 102 checks the lock word and determines whether lock is already taken or not. If lock is already taken, the first processor 102 asks for the lock word repeatedly until the first processor 102 sees the lock word consisting of all zero bits (i.e., until the lock is released).

Figure 2A:
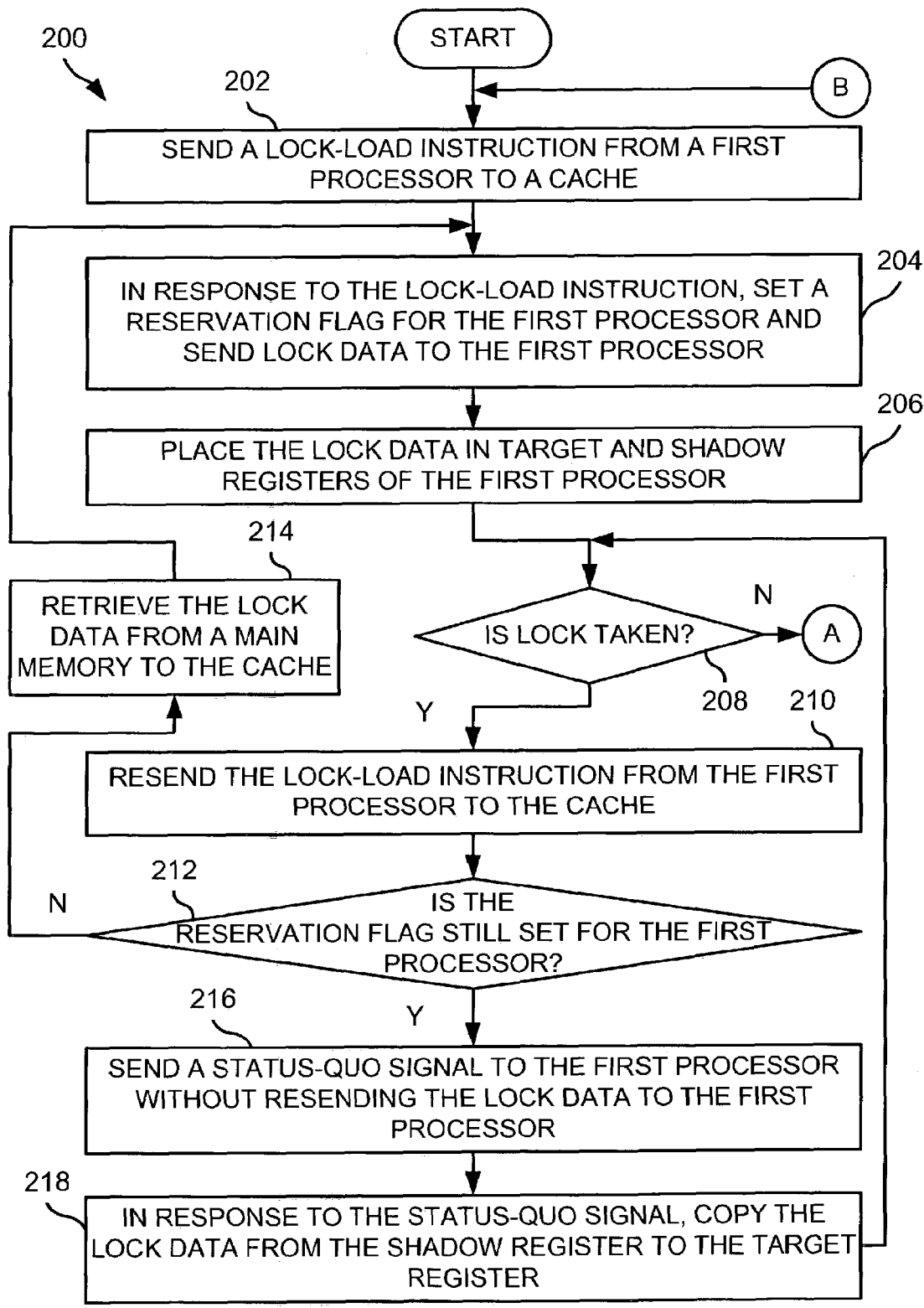
FIGS. 2A and 2B are flow diagrams illustrating enhanced lock acquisition in a multiprocessor system.
Figure 2B:
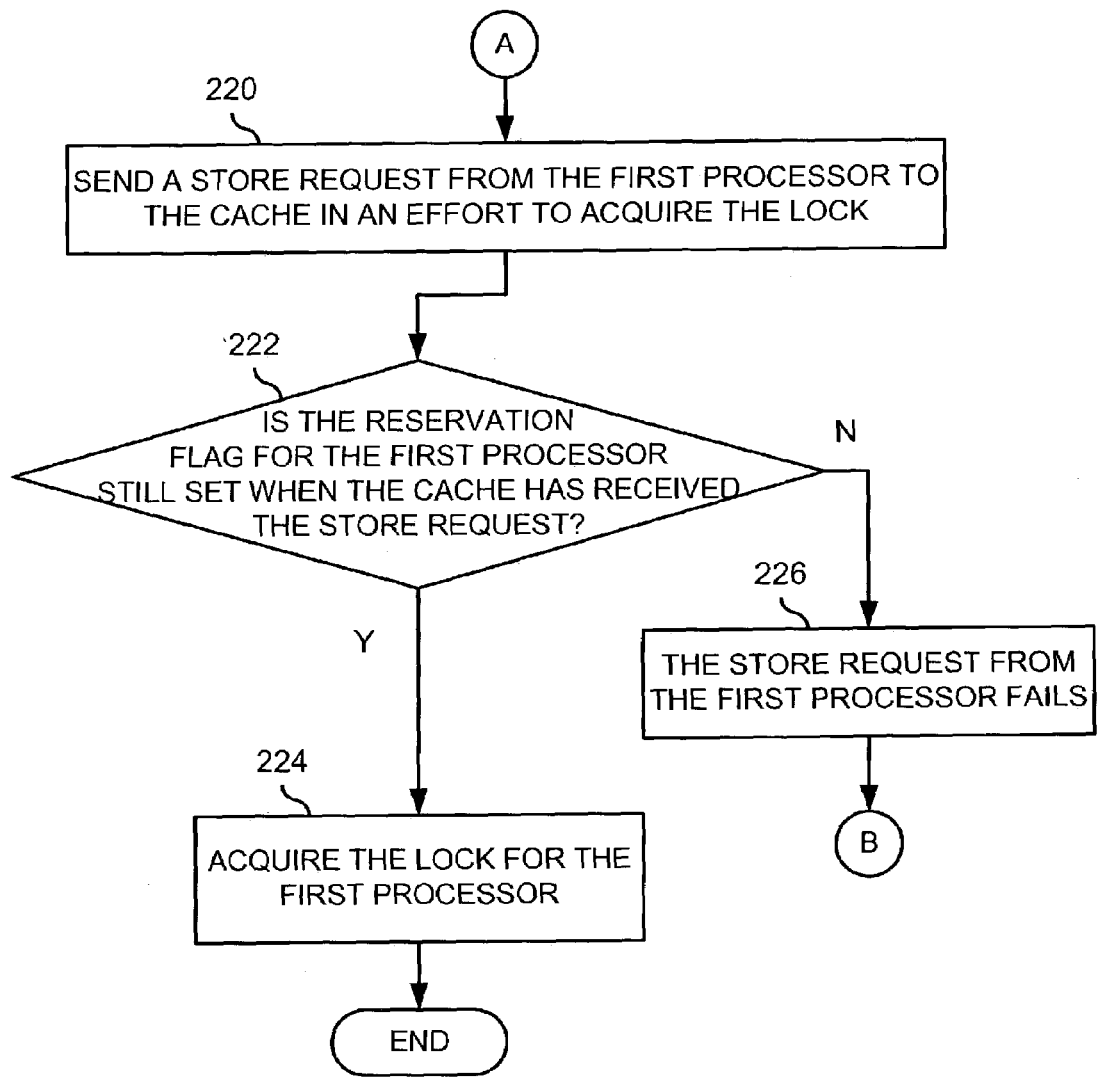

In a prior art system (not shown), the first processor 102 would keep accessing the cache 104 to retrieve the lock data 114 even during the time periods when the lock has not been released (i.e., the lock data 114 is not changed yet). This would translate into both unnecessary power consumption and a hindrance to the overall performance of the cache 104. The first processor 102, therefore, does not retrieve the lock data 114 during the time period when the lock is not released yet. Instead, the first processor 102 copies the lock data 114 from the shadow register 118 to the target register 116. Preferably, the cache 104 sends a status-quo signal to the first processor 102 in response to a lock-load instruction (not shown) from the first processor 102, when the lock is still taken (for example, by another processor). Note that, in a prior art system, old lock data originally retrieved from the cache would probably have been altered, and therefore, could not be reused. Referring now to FIGS. 2A and 2B, a flow diagram 200 illustrates enhanced lock acquisition in a multiprocessor system.

In step 202, a lock-load instruction is sent from a first processor to a cache. For example, the first processor 102 sends the lock-load instruction to the cache 104. The lock-load instruction asks the cache to return lock data.

In step 204, in response to the lock-load instruction, a reservation flag is set for the first processor and the lock data is sent to the first processor. For example, the cache 104 sets the reservation flag for the first processor 102 and sends the lock data 114 to the first processor 102. One skilled in the art will understand that setting the reservation flag requires the cache to access the lock's memory location, which includes identifying whether there is an existing reservation flag for the first processor and/or another processor.

In step 206, the lock data is placed in target and shadow registers of the first processor. For example, the first processor 102 places the lock data 114 in the target register 116 and the shadow register 118.

In step 208, it is determined whether lock is taken. For example, the first processor 102 checks the lock data 114 in the target register 116 and determines whether the lock data 114 indicates that lock is taken. If lock is taken, the process goes to step 210. Otherwise, the process goes to step 220.

In step 210, upon a determination that the lock is taken, the lock-load instruction is resent from the first processor to the cache. For example, the first processor 102 resends the lock-load instruction to the cache 104.

In step 212, it is determined whether the reservation flag is still set for the first processor. For example, the cache 104 checks the reservation flag for the first processor to see if it is still set. If it is still set, the process goes to step 216. If it is reset, it goes to step 214.

In step 214, upon a determination that the reservation flag for the first processor is reset, the lock data is retrieved from a main memory to the cache. For example, the lock data 114 is retrieved from the main memory 110 to the cache 104. Then, the process goes back to step 204.

In step 216, upon a determination that the reservation flag for the first processor is still set, a status-quo signal is sent to the first processor without resending the lock data to the first processor. For example, the status-quo signal is sent to the first processor 102 without resending the lock data 114 to the first processor 102. This means that the lock data 114 is not retrieved from the cache 104.

In step 218, in response to the status-quo signal, the lock data is copied from the shadow register to the target register. For example, the processor 102 copies the lock data 114 from the shadow register 118 to the target register 116. Then, the process goes back to step 208.

In step 220, upon a determination in step 208 that lock is taken, a store request is sent from the first processor to the cache in an effort to acquire the lock. For example, the first processor 102 sends the store request to the cache 104 in an effort to acquire the lock.

In step 222, it is determined whether the reservation flag for the first processor is still set when the cache has received the store request. For example, the cache 104 determines whether the reservation flag for the first processor 102 is still set when the cache 104 has received the store request from the first processor 102. If the reservation flag is still set, then the process goes to step 224. If the reservation flag is reset before the cache has received the store request, then the process goes to step 226.

In step 224, the lock is acquired for the first processor. For example, the first processor 102 acquires the lock and writes to the lock data to indicate its lock acquisition.

In step 226, the store request from the first processor fails and the process resumes by going back to step 202.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for enhancing lock acquisition in a multiprocessor system, the method comprising the steps of:

sending a lock-load instruction from a first processor to a cache;

in response to the lock-load instruction, accessing a lock memory location and if no reservation flag exists for the first processor, setting a reservation flag for the first processor and sending lock data to the first processor;

placing the lock data in target and shadow registers of the first processor;

determining from the lock data whether lock is taken;

upon a determination that the lock is taken, resending the lock-load instruction from the first processor to the cache;

determining whether the reservation flag is still set for the first processor;

upon a determination that the reservation flag is still set for the first processor, sending a status-quo signal to the first processor without resending the lock data to the first processor; and in response to the status-quo signal, copying the lock data from the shadow register to the target register.

2. The method of claim 1, further comprising the steps of:

upon a determination that the lock is not taken, sending a store request from the first processor to the cache in an effort to acquire the lock;

determining whether the reservation flag for the first processor is still set when the cache has received the store request;

upon a determination that the reservation flag for the first processor is still set when the cache has received the store request, acquiring the lock for the first processor; and upon a determination that the reservation flag for the first processor is reset when the cache has received the store request, failing the store request for the first processor.

3. The method of claim 1, further comprising the steps of:

upon a determination that the reservation flag is reset for the first processor, retrieving the lock data from a system memory to the cache; and in response to the lock-load instruction, setting the reservation flag for the first processor and sending lock data to the first processor.

4. The method of claim 1, further comprising the step of, upon copying the lock data from the shadow register to the target register, determining from the lock data whether lock is taken.

5. The method of claim 1, wherein the cache is a level 2 (L2) cache of the first processor.

6. The method of claim 1, wherein the lock data includes information on whether lock is taken or not.

7. The method of claim 1, wherein the lock data includes a lock word for indicating whether lock is taken or not.

8. The method of claim 7, wherein the lock word consisting of zero values in all bits indicates that lock is not taken.

9. The method of claim 1, wherein the first processor does not directly work on data placed in the shadow register.

10. The method of claim 1, wherein the reservation flag for the first processor is reset when a store operation is performed on the lock data by a bus master.

11. The method of claim 10, wherein the bus master is a second processor.

12. The method of claim 1, wherein the step of sending a status-quo signal to the first processor without resending the lock data to the first processor does not require accessing the cache.

13. The method of claim 1, further comprising the step of eliminating access to the cache for the same lock data while the reservation flag is set.

14. A multiprocessor system with enhanced lock acquisition, comprising:

a first processor;

a cache coupled to the first processor, the first processor sending a load-lock instruction to the cache, the cache, in response to the load-lock instruction, accessing a lock memory location and if no reservation flag exists for the first processor, setting a reservation flag for the first processor and sending lock data to the first processor;

a target register included in the first processor for holding the lock data to determine whether lock is taken; and a shadow register included in the first processor for holding the lock data to provide the lock data to the target register for lock evaluation in response to a status-quo signal from the cache to the first processor, the status-quo signal indicating that the lock is taken and the reservation flag is still set for the first processor.

15. The multiprocessor system of claim 14, further comprising:

a first bus controller coupled to the cache;

a system bus coupled to the first bus controller;

a system memory coupled to the system bus; and a second bus controller coupled to the system bus.

16. The multiprocessor system of claim 14, wherein the cache is a level 2 (L2) cache of the first processor.

17. The multiprocessor system of claim 14, wherein the lock data includes information on whether lock is taken or not.

18. The multiprocessor system of claim 14, wherein the lock data includes a lock word for indicating whether lock is taken or not.

19. The multiprocessor system of claim 14, wherein the lock word consisting of zero values in all bits indicates that lock is not taken.

20. The multiprocessor system of claim 14, wherein the first processor does not directly work on data placed in the shadow register.

21. The multiprocessor system of claim 14, wherein the reservation flag for the first processor is reset when a store operation is performed on the lock data by a bus master.

22. The multiprocessor system of claim 21, wherein the bus master is a second processor.

23. An apparatus for enhancing lock acquisition in a multiprocessor system, the apparatus comprising:

means for sending a lock-load instruction from a first processor to a cache;

means for, in response to the lock-load instruction, accessing a lock memory location and if no reservation flag exists for the first processor, setting a reservation flag for the first processor and sending lock data to the first processor;

means for placing the lock data in target and shadow registers of the first processor;

means for determining from the lock data whether lock is taken;

means for, upon a determination that the lock is taken, resending the lock-load instruction from the first processor to the cache;

means for determining whether the reservation flag is still set for the first processor;

means for, upon a determination that the reservation flag is still set for the first processor, sending a status-quo signal to the first processor without resending the lock data to the first processor; and means for, in response to the status-quo signal, copying the lock data from the shadow register to the target register.

24. The apparatus of claim 23, further comprising:

means for, upon a determination that the lock is not taken, sending a store request from the first processor to the cache in an effort to acquire the lock;

means for determining whether the reservation flag for the first processor is still set when the cache has received the store request;

means for, upon a determination that the reservation flag for the first processor is still set when the cache has received the store request, acquiring the lock for the first processor; and means for, upon a determination that the reservation flag for the first processor is reset when the cache has received the store request, failing the store request for the first processor.

25. The apparatus of claim 23, further comprising:
means for, upon a determination that the reservation flag is reset for the first processor, retrieving the lock data from a system memory to the cache; and
means for, in response to the lock-load instruction, setting the reservation flag for the first processor and sending lock data to the first processor.

26. The apparatus of claim 23, further comprising means for, upon copying the lock data from the shadow register to the target register, determining from the lock data whether lock is taken.

27. The apparatus of claim 23, wherein the cache is a level 2 (L2) cache of the first processor.

28. The apparatus of claim 23, wherein the lock data includes information on whether lock is taken or not.

29. The apparatus of claim 23, wherein the lock data includes a lock word for indicating whether lock is taken or not.

30. The apparatus of claim 29, wherein the lock word consisting of zero values in all bits indicates that lock is not taken.

31. The apparatus of claim 23, wherein the first processor does not directly work on data placed in the shadow register.

32. The apparatus of claim 23, wherein the reservation flag for the first processor is reset when a store operation is performed on the lock data by a bus master.

33. The apparatus of claim 32, wherein the bus master is a second processor.

34. A computer program product for enhancing lock acquisition in a multiprocessor system, the computer program product having a medium with a computer program embodied thereon, the computer program comprising:
computer program code for sending a lock-load instruction from a first processor to a cache;
computer program code for, in response to the lock-load instruction, accessing a lock memory location and if no reservation flag exists for the first processor, setting a reservation flag for the first processor and sending lock data to the first processor;
computer program code for placing the lock data in target and shadow registers of the first processor;
computer program code for determining from the lock data whether lock is taken;
computer program code for, upon a determination that the lock is taken, resending the lock-load instruction from the first processor to the cache;
computer program code for determining whether the reservation flag is still set for the first processor;
computer program code for, upon a determination that the reservation flag is still set for the first processor, sending a status-quo signal to the first processor without resending the lock data to the first processor; and
computer program code for, in response to the status-quo signal, copying the lock data from the shadow register to the target register.

35. The computer program product of claim 34, the computer program further comprising:
computer program code for, upon a determination that the lock is not taken, sending a store request from the first processor to the cache in an effort to acquire the lock;
computer program code for determining whether the reservation flag for the first processor is still set when the cache has received the store request;
computer program code for, upon a determination that the reservation flag for the first processor is still set when the cache has received the store request, acquiring the lock for the first processor; and
computer program code for, upon a determination that the reservation flag for the first processor is reset when the cache has received the store request, failing the store request for the first processor.

36. The computer program product of claim 34, further comprising:
computer program code for, upon a determination that the reservation flag is reset for the first processor, retrieving the lock data from a system memory to the cache; and
computer program code for, in response to the lock-load instruction, setting the reservation flag for the first processor and sending lock data to the first processor.

37. The computer program product of claim 34, the computer program further comprising computer program code for, upon copying the lock data from the shadow register to the target register, determining from the lock data whether lock is taken.

38. The computer program product of claim 34, wherein the cache is a level 2 (L2) cache of the first processor.

39. The computer program product of claim 34, wherein the lock data includes information on whether lock is taken or not.

40. The computer program product of claim 34, wherein the lock data includes a lock word for indicating whether lock is taken or not.

41. The computer program product of claim 40, wherein the lock word consisting of zero values in all bits indicates that lock is not taken.

42. The computer program product of claim 34, wherein the first processor does not directly work on data placed in the shadow register.

43. The computer program product of claim 34, wherein the reservation flag for the first processor is reset when a store operation is performed on the lock data by a bus master.

44. The computer program product of claim 43, wherein the bus master is a second processor.

* * * * *